US006810471B2

(12) United States Patent
Fujii

(10) Patent No.: US 6,810,471 B2
(45) Date of Patent: Oct. 26, 2004

(54) MEMORY PROTECTION METHOD AND CIRCUIT SPECIFYING ATTRIBUTES ON ACCESS

(75) Inventor: Zenya Fujii, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 198 days.

(21) Appl. No.: 10/180,684

(22) Filed: Jun. 24, 2002

(65) Prior Publication Data

US 2002/0199076 A1 Dec. 26, 2002

(30) Foreign Application Priority Data

Jun. 25, 2001 (JP) ........................................ 2001-191550

(51) Int. Cl.[7] .......................... G06F 12/00; G06F 13/00
(52) U.S. Cl. ........................ 711/163; 711/151; 711/158
(58) Field of Search ................................. 711/100, 151, 711/152, 154, 158, 163, 170, 200

(56) References Cited

U.S. PATENT DOCUMENTS 6,021,476 A * 2/2000 Segars ........................ 711/163
2002/0065993 A1 * 5/2002 Chauvel ..................... 711/144

* cited by examiner

Primary Examiner—Tuan V. Thai
(74) Attorney, Agent, or Firm—Christensen, O'Connor Johnson Kindness PLLC

(57) ABSTRACT

There are provided a plurality of priority register circuits which specify respective priorities for a plurality of logical regions, so that the priority of the logical regions can be varied. Even if there is a change in a memory map, the degree of freedom for setting changes is high compared to a case when the priority is fixed. Thus, the purpose can be attained more likely by a processing of changing the priority where the processing involves comparatively low number of bits.

20 Claims, 4 Drawing Sheets

FIG.2

| Size[4:0] | Area |
|---|---:|
| 0b00000 | 0B |
| 0b00001 | (SETTING NOT POSSIBLE) |
| ... | (SETTING NOT POSSIBLE) |
| 0b00110 | (SETTING NOT POSSIBLE) |
| 0b00111 | 256B |
| 0b01000 | 512B |
| 0b01001 | 1KB |
| 0b01010 | 2KB |
| 0b01011 | 4KB |
| 0b01100 | 8KB |
| 0b01101 | 16KB |
| 0b01110 | 32KB |
| 0b01111 | 64KB |
| 0b10000 | 128KB |
| 0b10001 | 256KB |
| 0b10010 | 512KB |
| 0b10011 | 1MB |
| 0b10100 | 2MB |
| 0b10101 | 4MB |
| 0b10110 | 8MB |
| 0b10111 | 16MB |
| 0b11000 | 32MB |
| 0b11001 | 64MB |
| 0b11010 | 128MB |
| 0b11011 | 256MB |
| 0b11100 | 512MB |
| 0b11101 | 1GB |
| 0b11110 | 2GB |
| 0b11111 | 4GB |

FIG. 3

| ACCESS ATTRIBUTE CODE | ACCESS ATTRIBUTE |
|---|---|
| 0b00 | NO ACCESS |
| 0b01 | (SETTING NOT POSSIBLE) |
| 0b10 | READ ONLY |
| 0b11 | FULL ACCESS |

FIG. 4

| PRIORITY CODE | PRIORITY |
|---|---|
| 0b00 | LOW |
| 0b01 | ↑ |
| 0b10 | ↓ |
| 0b11 | HIGH |

# MEMORY PROTECTION METHOD AND CIRCUIT SPECIFYING ATTRIBUTES ON ACCESS

BACKGROUND OF THE INVENTION

1. Field of the Invention

This present invention relates to a memory protection technology, and it particularly relates to a method and a circuit for individually specifying attributes on access by address ranges.

2. Description of the Related Art

Microprocessors and other data processing apparatuses execute access for read, write and so forth by issuing addresses to a memory or other devices (hereinafter referred to simply as a "device") in the logical address space. Depending on the addresses, logical regions may often be defined where read and write are both permitted, where only read may be permitted, or where neither read nor write is permitted. These characteristics concerning access (hereinafter referred to as "access attributes" or simply as "attributes") may sometimes be set in units of logical regions called "pages," for instance. To prohibit or restrict the rewrite or read of data of a device by setting attributes is generally called protection.

One example of a memory protection circuit in which attributes are individually specified by address ranges can be found in U.S. Pat. No. 6,021,476. In this circuit according to the U.S. patent, each of address ranges for a plurality of logical regions can be specified, and priority is fixedly predetermined for each of the logical regions. And when an address issued by a microprocessor is contained in an address range for a plurality of logical regions, the logical region with the highest priority (hereinafter referred to as "the highest priority region" also) is selected, and access is executed in accordance with the attributes determined for the logical region.

For example, where 4 KB of operating system (hereinafter described as "OS") program region and 12 KB of user program region are mapped into a 16 KB RAM, a region of 16 KB is, in general, first divided into four regions of 4 KB each, and then one of them is assigned to the "OS program region" and the remaining three to the "user program region." This requires at least four times of setting operations. In the case of the above-mentioned U.S. patent, however, the purpose is attained if the whole region of 16 KB is mapped into the "user program region" and then the 4 KB portion of it only is mapped to overlap in the "OS program region" and the priority for this 4 KB is set higher. This requires the defining of two regions only, thus making the setting simpler.

However, the inventor has come to realize that because of fixed priorities given to the logical regions in the above-mentioned patent, there is room for improvement in the setting change following the change of memory map. For instance, consider a case where the attributes for a 30 KB logical region containing addresses 0xffff8000 (0xffff8000 indicates ffff8000 in the hexadecimal notation; hereinafter, "0x" represents hexadecimal in the similar manner) to 0xffffff7ff are full access, which means both readable and writable, and cacheable, and the attributes for a 2 KB logical region containing addresses 0xfffff800 to 0xffffffff are read only and cacheable. In the case of the above-mentioned U.S. patent, when the priorities are fixed in advance as logical region 0<logical region 1<logical region 2, that is, when logical region 2 is fixed as the highest priority region, the setting is made as:

For Logical Region 0:
The address range is 32 KB from 0xffff8000 to 0xffffffff.
The attributes are full access and cacheable.
For Logical Region 1:
The address range is 2 KB from 0xfffff800 to 0xffffffff.
The attributes are read only and cacheable.

Here, consider a case of a change of memory map in which the attributes for 6 KB only of the 30 KB full-access and cacheable logical region are changed to read-only and uncacheable. Then the setting will be made as:

For Logical Region 0:
The address range is 32 KB from 0xffff8000 to 0xffffffff.
The attributes are full access and cacheable.
For Logical Region 1:
The address range is 8 KB from 0xfffe000 to 0xffffffff.
The attributes are read only and uncacheable.
For Logical Region 2:
The address range is 2 KB from 0xfffff800 to 0xffffffff.
The attributes are read only and cacheable.

Here, the 2 KB logical region, which was read only and cacheable before the change of memory map, retains the same address range and the same attributes of read only and cacheable even after the change of memory map, but, for that logical region, the address range and attributes set for logical region 1 before the memory map change must be changed to the setting for logical region 2. Thus, where a memory protection circuit is set by the program of a microprocessor, the changing of the program is complex and therefore requires an extremely careful work.

Moreover, where memory is protected by dynamically changing the attributes by a program, it is naturally desired that there be fewer processing steps for the setting change.

SUMMARY OF THE INVENTION

The present invention has been made in view of foregoing problems, and an object thereof is to make simpler the modification of the program necessary to change the setting of a memory protection circuit or to reduce the number of processing steps required for the setting change.

A preferred embodiment according to the present invention relates to a memory protection circuit which controls access, in a logical address space, to a device from a data processing apparatus such as a microprocessor. This circuit comprises: an address range register unit which respectively specifies address ranges of a plurality of logical regions in the logical address space; an attribute register unit which specifies an access attribute for each of the logical regions; an address comparison unit which judges whether or not an access request address for the device is contained in each of the logical regions; a priority register unit which specifies priority of access for each of the logical regions; an attribute determining unit, when there is a logical region or more which is judged as containing the access request address, which specifies and outputs an attribute specified for a logical region whose priority is highest among the logical regions; and a register setting unit which is capable of repeatedly setting the address range register unit, the attribute register unit and the priority register unit.

Representative of the "device" is a memory as mentioned earlier. Yet it is not necessary for the device to be memory as long as it is accessible via logical address space similar to memory map. For example, the device may be a memory-mapped I/O device. Moreover, optional devices, the appearance of which is indistinguishable between memory and I/O device, such as various extended bus cards, are "devices" as long as at least part of them is mapped into a logical address space.

Similarly, the "memory protection circuit" does not necessarily have memory as its target of protection, but is a general term for circuits that protect arbitrary devices mapped to the logical address space in the same way as the memory mapped thereto.

Since this circuit can set the priorities of the logical regions variably and repeatedly, the setting change of address range and attributes necessitated by the setting change of protection becomes simple.

This circuit may further include a protection error unit which outputs a protection error signal when none of the logical regions is judged to contain the access request address or when an access attribute for the access request address is not of permitting nature. This structure may be realized by, for example, a gate element which outputs the protection error signal as active when, for example, all of comparison results by the address comparison unit indicate "not contained".

This circuit may further include a unit which outputs a protection error signal when the access attribute for the access request address indicates "access prohibited". As an example, the protection error signal is outputted in a case where the attribute of an access request address is "read only" while the data processing apparatus is activating write operation for the access request address.

This circuit may further include a selection unit which selects a predetermined access attribute when none of the logical regions is judged to contain the access request address. Such access will be, for example, "no access (both read and write are prohibited)". Specifically speaking, there may be provided a default attribute register unit which sets an attribute in a case when none of the logical regions is judged to contain the access request address, and a register setting unit which is capable of repeatedly setting said default attribute register unit.

Another preferred embodiment according to the present invention relates also to a memory protection circuit which controls access, in a logical address space, to a device from a data processing apparatus. This circuit includes: an address range register unit which sets address ranges of a plurality of logical regions in the logical address space in a manner that overlapping is permitted; and a priority register unit which specifies access priority for each of the plurality of logical regions so that the access priority can be reset externally. In this structure, when an access request address to the device is simultaneously contained in the plurality of logical regions, a logical region whose priority is highest is selected as an access destination.

Still another preferred embodiment according to the present invention relates to a memory protection method. This method includes: setting address ranges of a plurality of logical regions in a logical address space in a manner that overlapping is permitted; when an access request address is simultaneously contained in the plurality of logical regions, determining a logical region whose priority is highest by referring to priorities of the logical regions; identifying an access attribute of the logical region whose priority was determined highest; generating access according to the identified access attribute; and resetting, as appropriate, the priorities in each of the plurality of logical regions.

Moreover, this summary of the invention does not necessarily describe all necessary features so that the invention may also be sub-combination of these described features.

BRIEF DESCRIPTION OF THE DRAWINGS

FIG. 2 shows an example of logical region sizes applied to memory protection circuits according to first and second embodiments.

FIG. 3 shows an example of access attributes applied to memory protection circuits according to first and second embodiments.

FIG. 4 shows an example of priorities applied to memory protection circuits according to first and second embodiments.

DETAILED DESCRIPTION OF THE INVENTION

Figure 1:
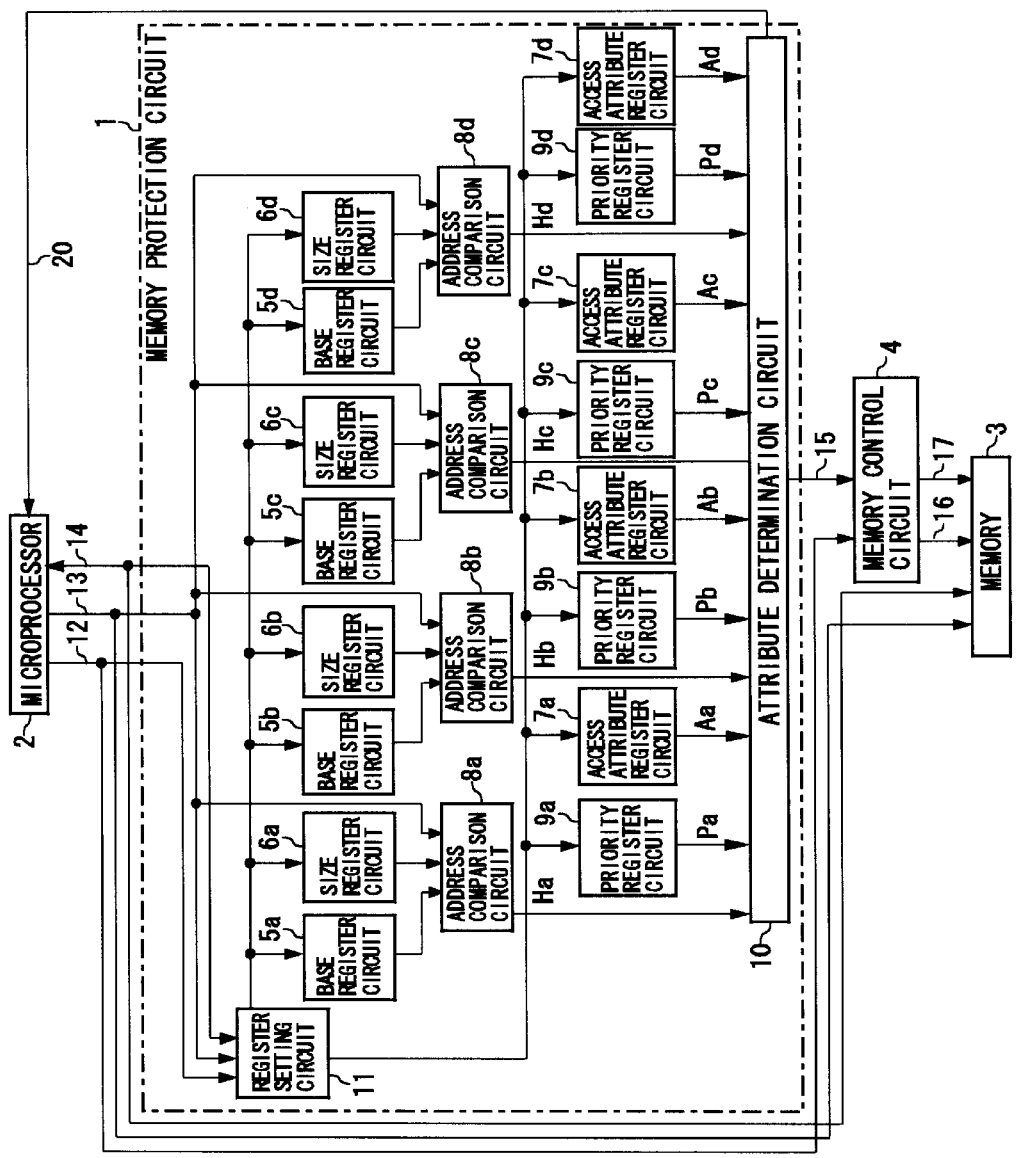
FIG. 1 is a block circuit diagram illustrating a structure of a memory protection circuit according to a first embodiment of the present invention.

The invention will now be described based on the preferred embodiments, which do not intend to limit the scope of the present invention, but exemplify the invention. All of the features and the combinations thereof described in the embodiment are not necessarily essential to the invention.
First Embodiment FIG. 1 is a block circuit diagram illustrating a structure of a memory protection circuit according to an embodiment of the present invention. Referring to FIG. 1, the memory protection circuit 1 is connected to a microprocessor 2, a memory 3, and a memory control circuit 4 and allows the setting of four logical regions A, B, C and D. In correspondence to the four logical regions, there are provided four each of base register circuits 5a to 5d, size register circuits 6a to 6d, access attribute register circuits 7a to 7d, address comparison circuits 8a to 8d, priority register circuits 9a to 9d. And there are an attribute determination circuit 10 and a register setting circuit 11.

The four base registers 5a to 5d store 24 high-order bits of 32 bits of the base address of the logical regions A to D, respectively. The 8 low-order bits of the base address are "don't care" here, which means they are not referenced. Thus, in determining the base address, all these 8 bits are regarded as 0.

The four size registers 6a to 6d store size codes which represent the sizes of the logical regions A to D, respectively.

FIG. 2 is an example of coding of logical region sizes that are employed in the present embodiment and shows relationships between the size codes held by each of the four size registers 6a to 6b and the sizes of the logical regions. Here, "0b" of 0b01010 means a binary number, and the similar notation will be used hereinafter. For example, in a case where a value 0xfffff8 is held in the base register 5a corresponding to the logical region A and the size code 0b01010 is held in the size register 6a, the address range of the logical region A will be 2 KB from 0xfffff800 to 0xffffffff. It is to be noted that, as shown in FIG. 2, it is possible to set the address range to zero by assigning 0b00000.

The four access attribute register circuits 7a to 7d store the access attribute codes Aa to Ad of the logical regions A to D, respectively. FIG. 3 is an example of coding of attributes that are employed in the present embodiment and shows relationships between access attribute codes held by each of the access attribute register circuits 7a to 7d and attributes of the logical regions. Here, "No access," "Read only" and "Full access" can be set, but other settings are reserved and cannot be set.

The base addresses outputted from the four base registers 5a to 5d, namely, the higher-order 24 bits of the 32-bit address, are inputted to the four address comparison circuits 8a to 8d, respectively. Size codes outputted from the four size registers 6a to 6d are inputted to these address comparison circuits 8a to 8d, respectively. Moreover, an address (hereinafter referred to as an "access request address") outputted via an address bus 13 from the microprocessor 2 is inputted to all the address comparison circuits 8a to 8d.

The address comparison circuit 8a corresponding to the logical region A judges whether or not the access request address is contained in the address range of logical region A, and outputs a hit signal Ha to the attribute determination circuit 10 only when the judgment result is "contained." Similarly, the address comparison circuits 8b to 8d corresponding to the logical regions B to D output hit signals Hb to Hd for the logical regions B to D, respectively.

The four priority register circuits 9a to 9d store priority codes Pa to Pd of logical regions A to D, respectively. FIG. 4 is an example of coding of priorities that are employed in the present embodiment and shows relationships between the priority codes stored by each of the priority register circuits 9a to 9d and priorities of the logical regions A to D.

From the microprocessor 2, the register setting circuit 11 receives access control signals over an access control line 12, addresses over an address bus 13 and data over a data bus 14. These signals set the base register circuits 5a to 5d, the size register circuits 6a to 6d, the access attribute register circuits 7a to 7d and the priority register circuits 9a to 9d accordingly.

The attribute determination circuit 10 receives said hit signals Ha to Hd outputted from the four address comparison circuits 8a to 8d, respectively, the priority codes Pa to Pd outputted from the four priority register circuits 9a to 9d, respectively, and the access attribute codes Aa to Ad outputted from the four access attribute register circuits 7a to 7d, respectively.

According to the hit signals Ha to Hd, the attribute determination circuit 10 first determines which of the logical regions A to D contain or contains the access request address. The attribute determination circuit 10 then selects the highest priority region from among the logical regions containing the address, specifies the access attribute corresponding to the selected region, and outputs the code of the specified attribute by way of an attribute output line 15. It is to be noted here that when the access request address is not contained in any of the logical regions A to D, the attribute determination circuit 10 outputs an access attribute code 0b00 indicating "no access" and at the same time outputs a protection error signal 20 as "active." This protection error signal 20 is inputted to an interrupt signal input or the like of the microprocessor 2 so as to activate a necessary error handling process. Thus, this structure makes it possible to avoid any unexpected operation when an access is attempted by mistake to a logical region where a device is not assigned. The memory control circuit 4 permits, restricts or prohibits access to the access request address, based on the outputted attribute code. A read enable signal 16 is utilized for a read operation from the memory 3, and a write enable signal 17 is utilized for a write operation thereto.

Actual examples of settings employing the above-described structure will be described in detail hereinbelow:

Setting Example 1

To establish "read only" for a 2 KB logical region of the address range from 0x00000000 to 0x000007ff and "no access" for the address range from 0x00000800 to 0xffffffff, the following setting is carried out:
For Logical Region A:
  Base register circuit 5a: 0x000000 (The base address is 0x00000000.)
  Size register circuit 6a: 0b11111 (The size is 4 GB.)
  Access attribute register circuit 7a: 0b00 (No access)
  Priority register circuit 9a: 0b00 (The priority is the lowest.)
For Logical Region B:
  Base register circuit 5b: 0x000000 (The base address is 0x00000000.)
  Size register circuit 6b: 0b01010 (The size is 2 KB.)
  Access attribute register circuit 7b: 0b10 (Read only)
  Priority register circuit 9b: 0b01 (The priority is higher than that of the logical region A.)
For Logical Region C:
  Size register circuit 6c: 0b00000 (The size is 0B.)
For Logical Region D:
  Size register circuit 6d: 0b00000 (The size is 0B.)

It is to be noted that because the sizes for the logical regions C and D are set to 0B, the settings for their base register circuits 5c and 5d, the access attribute register circuits 7c and 7d and the priority register circuits 9c and 9d may be made arbitrarily.

Under these settings if write to address 0x00000000 is attempted by the microprocessor 2, hits will occur at the logical regions A and B and the logical region B with a higher priority than the logical region A will be selected, then "read only," which is the access attribute corresponding to the logical region B, will be selected, and the attribute code "0b10" will be outputted over the attribute output line 15. On the other hand, an access control signal indicating a write operation is inputted to the memory control circuit 4 via the access control line 12 from the microprocessor 2.

Despite the attempt by the microprocessor 2 to write, the memory control circuit 4 judges that the access request address is contained in the logical region B whose attribute is "read only" and thus keeps a write enable signal to the memory 3 inactive. As a result, the write operation to the address is inhibited.

When a desired access is not realized as in the above case, the attribute determination circuit 10 may notify the microprocessor 2 by turning the protection error signal 20 active. This may be accomplished by connecting the access control line 12 to the attribute determination circuit 10 by a path (not shown), and thus by having the attribute determination circuit 10 judge the type of access on its own. This judgment may of course be made by the memory control circuit 4, and in that case, this memory control circuit 4 may turn the protection error signal 20 active by a path (not shown here).

Setting Example 2

Next, consider a case where the access attribute of the 6 KB logical region of the address range from 0x00000800 to 0x00001fff is changed to "full access" and the access attributes of the other logical regions are not changed. Then, the following setting changes are to be made:
For Logical Region B:
  Priority register circuit 9b: 0b10
For Logical Region C:
  Base register circuit 5c: 0x000000 (The base address is 0x00000000.)
  Size register circuit 6c: 0b01100 (The size is 8 KB.)
  Access attribute register circuit 7c: 0b11 (Full access)
  Priority register circuit 9c: 0b01 (The priority is lower than that of logical region B.)

The above are examples of settings for access control in the present embodiment.

To clarify the effects of the present embodiment, the settings where the four priority register circuits 9a to 9d in FIG. 1 are not present are considered hereinbelow. Here, the priorities of the logical regions are fixed in advance, and it is assumed that logical region A<logical region B<logical region C <logical region D, so that the logical region D is the highest priority region. The setting examples 1 and 2 below are the same as those described above.

SETTING EXAMPLE 1

For Logical Region A:
  Base register circuit 5a: 0x000000 (The base address is 0x00000000.)
  Size register circuit 6a: 0b11111 (The size is 4 GB.)
  Access attribute register circuit 7a: 0b00 (No access)
For Logical Region B:
  Base register circuit 5b: 0x000000 (The base address is 0x00000000.)
  Size register circuit 6b: 0b01010 (The size is 2 KB.)
  Access attribute register circuit 7b: 0b10 (Reads only)
For Logical Region C:
  Size register circuit 6c: 0b00000 (The size is 0B.)
For Logical Region D:
  Size register circuit 6d: 0b00000 (The size is 0B.)

It is to be noted that because the sizes for the logical regions C and D are set to 0B too, the settings for their base register circuits 5c and 5d and the access attribute register circuits 7c and 7d may be made arbitrarily.

SETTING EXAMPLE 2

For Logical Region B:
  Base register circuit 5b: 0x000000 (The base address is 0x00000000.)
  Size register circuit 6b: 0b01100 (The size is 8 KB.)
  Access attribute register circuit 7b: 0b11 (Full access)
For Logical Region C:
  Base register circuit 5c: 0x000000 (The base address is 0x00000000.)
  Size register circuit 6c: 0b01010 (The size is 2 KB.)
  Access attribute register circuit 7c: 0b10 (Read only)

As seen from the above, there will be the increased number of registers that require re-setting in the setting change compared to the case where the memory protection circuit 1 according to the present embodiment is used. Moreover, the above case requires the re-setting of the registers with larger numbers of bits, such as base register circuit 5c, thus being disadvantageous in this respect too. On the other hand, the present embodiment is further advantageous in a point where the priority codes can be specified by extremely small numbers of bits, in general. While the present embodiment concerned only the attributes that are read and write, it is to be noted that as there are more types of attributes, including cacheable and uncacheable, there will be greater differences in the numbers of register circuits that require re-setting in the setting change.

Second Embodiment

Figure 5:
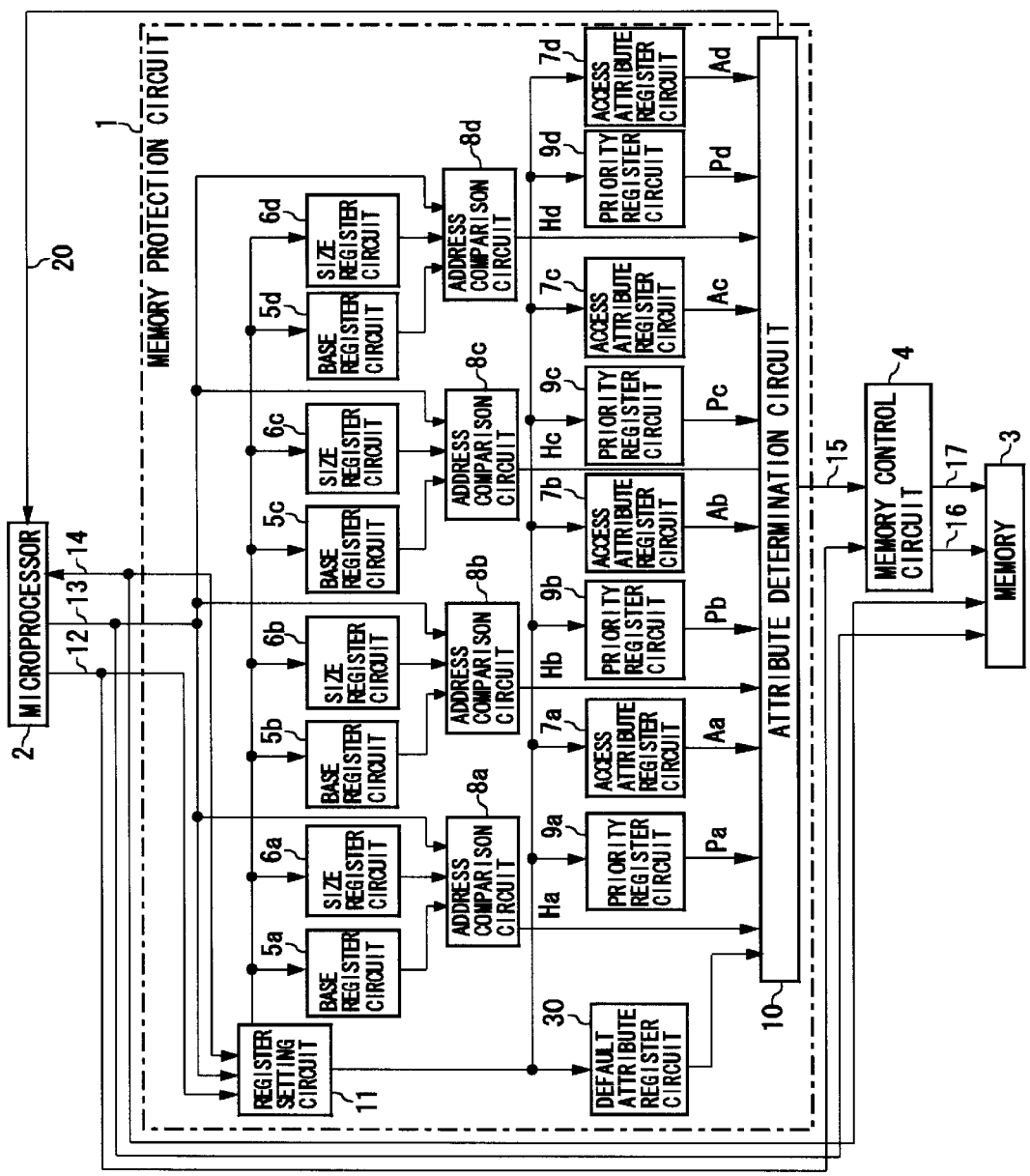
FIG. 5 is a block circuit diagram illustrating a structure of a memory protection circuit according to a second embodiment of the present invention.

FIG. 5 is a block circuit diagram illustrating a structure of a memory protection circuit according to another embodiment of the present invention. In FIG. 5, the same reference numerals are given to the structure identical to that in the first embodiment, and differences only will be discussed hereinbelow.

In this second embodiment, a default attribute register circuit 30 is provided anew, and an output therefrom is fed to the attribute determination circuit 10. The default attribute register circuit 30 is set by the register setting circuit 11.

The default attribute register circuit 30 sets beforehand an attribute to be selected (hereinafter referred to as a "default attribute") when none of logical regions is judged to contain the access request address. In the first embodiment, "no access" is returned fixedly, but "0b00" in correspondence to "no access" or "0b10" in correspondence to "read only", for instance, may be set by the default attribute register circuit 30. As still another example, if "0b01" indicating "setting not possible" (not settable) in FIG. 3, for instance, is returned as a default attribute instead, the microprocessor 2 will be able to make an error analysis easily by judging whether "the access was completely rejected despite the presence of the access request address in some of the logical regions" or "the access request address was not present in any of the logical regions".

The present invention has been described based on preferred embodiments which are only exemplary. It should be understood by those skilled in the art that these are only exemplary and there exist many other various modifications. The following are some of such examples.

The protection error signal 20, which is transmitted directly to the microprocessor 2 in the embodiment, may be once inputted to an interrupt controller or another element before it is indirectly notified to the microprocessor 2. Besides, it is not always necessary that the signal be conveyed to the microprocessor 2.

In the present embodiments, the microprocessor 2 is considered as an entity that accesses the memory 3. However, the entity may of course be other than the microprocessor 2. For example, the entity may be an arbitrary external processor or a DMA (Direct Memory Access) controller or any like elements. In such cases, information on which entity is accessing the memory 3 may be acquired from a bus arbiter, for example, and the output from the access attribute register circuits 7a to 7d may be changed according to the information thus acquired. For example, there may be a case where the full access from the microprocessor 2 to a certain logical region is permitted while the read only setting is required from the other bus masters. In such a case, two each of access attribute register circuits 7a to 7d may be provided and the output may be selected according to the bus masters.

The priority register circuits 9a to 9d, which have each a 2-bit configuration in the present embodiments, may be unified into a register of 8 or more bits. In that case, all the priorities are switched simultaneously, so that the occurrence of a critical timing, such as when the same priority is set for a plurality of logical regions, can be avoided. This unification or integration of registers is similarly applicable to any of the other registers.

Although the present invention has been described by way of exemplary embodiments, it should be understood that many changes and substitutions may be made by those skilled in the art without departing from the scope of the present invention which is defined by the appended claims.

What is claimed is:

1. A memory protection circuit which controls access, in a logical address space, to a device from a data processing apparatus such as a microprocessor, the circuit comprising:
    an address range register unit which respectively specifies address ranges of a plurality of logical regions in the logical address space;
    an attribute register unit which specifies an access attribute for each of the logical regions;
    an address comparison unit which judges whether or not an access request address for the device is contained in each of the logical regions;
    a priority register unit which specifies priority of access for each of the logical regions;
    an attribute determining unit, when there is a logical region or more which is judged as containing the access request address, which specifies and outputs an attribute specified for a logical region whose priority is highest among the logical regions; and a register setting unit which is capable of repeatedly setting said address range register unit, said attribute register unit and said priority register unit.

2. A memory protection circuit according to claim 1, wherein said address range register unit is capable of setting a state of no address range.

3. A memory protection circuit according to claim 2, further comprising a protection error unit which outputs a protection error signal when none of the logical regions is judged to contain the access request address or when an access attribute for the access request address indicates prohibition of access.

4. A memory protection circuit according to claim 3, further comprising a selection unit which selects a predetermined access attribute when none of the logical regions is judged to contain the access request address.

5. A memory protection circuit according to claim 3, wherein the protection error signal is notified directly to the data processing apparatus.

6. A memory protection circuit according to claim 3, wherein the protection error signal is notified indirectly to the data processing apparatus via other element.

7. A memory protection circuit according to claim 2, further comprising a selection unit which selects a predetermined access attribute when none of the logical regions is judged to contain the access request address.

8. A memory protection circuit according to claim 1, further comprising a protection error unit which outputs a protection error signal when none of the logical regions is judged to contain the access request address or when an access attribute for the access request address indicates prohibition of access.

9. A memory protection circuit according to claim 3, further comprising a selection unit which selects a predetermined access attribute when none of the logical regions is judged to contain the access request address.

10. A memory protection circuit according to claim 3, wherein the protection error signal is notified directly to the data processing apparatus.

11. A memory protection circuit according to claim 8, wherein the protection error signal is notified indirectly to the data processing apparatus via other element.

12. A memory protection circuit according to claim 1, further comprising a selection unit which selects a predetermined access attribute when none of the logical regions is judged to contain the access request address.

13. A memory protection circuit according to claim 1, wherein said attribute register unit acquires information on the data processing apparatus, and changes an output therefrom according to the acquired information.

14. A memory protection circuit which controls access, in a logical address space, to a device from a data processing apparatus, the circuit including:

an address range register unit which sets address ranges of a plurality of logical regions in the logical address space in a manner that overlapping is permitted; and a priority register unit which specifies access priority for each of the plurality of logical regions so that the access priority can be reset externally;

wherein, when an access request address to the device is simultaneously contained in the plurality of logical regions, a logical region whose priority is highest is selected as an access destination.

15. A memory protection circuit according to claim 1, wherein said address range register unit includes:

a base register unit which indicates a start address of the logical region; and a size register unit which specifies size of the logical region.

16. A memory protection circuit according to claim 15, wherein said size register unit specifies size of the logical region by discrete values.

17. A memory protection circuit according to claim 14, wherein said address range register unit includes:

a base register unit which indicates a start address of the logical region; and a size register unit which specifies size of the logical region.

18. A memory protection circuit according to claim 17, wherein said size register unit specifies size of the logical region by discrete values.

19. A memory protection method, comprising:

setting address ranges of a plurality of logical regions in a logical address space in a manner that overlapping is permitted;

when an access request address is simultaneously contained in the plurality of logical regions, determining a logical region whose priority is highest by referring to priorities of the logical regions;

identifying an access attribute of the logical region whose priority was determined highest;

generating access according to the identified access attribute; and resetting, as appropriate, the priorities in each of the plurality of logical regions.

20. A memory protection method according to claim 19, further including: setting the access attribute for each of the plurality of logical regions.

* * * * *